United States Patent
Leon Plata et al.

(10) Patent No.: US 12,155,660 B2
(45) Date of Patent: *Nov. 26, 2024

(54) MIGRATION OF USER AUTHENTICATION FROM ON-PREMISE TO THE CLOUD

(71) Applicant: Microsoft Technology Licensing, LLC, Redmond, WA (US)

(72) Inventors: Luis Carlos Leon Plata, Seattle, WA (US); Rama Mohan Rao Dintakurthi, Redmond, WA (US); Xin Yu Chong, Seattle, WA (US); Sushant Choudhary, Lynnwood, WA (US); Ramiro Calderon Romero, Monroe, WA (US); David Alan Gregory, Charlotte, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,270

(22) Filed: Oct. 10, 2023

(65) Prior Publication Data

US 2024/0048561 A1 Feb. 8, 2024

Related U.S. Application Data

(63) Continuation of application No. 17/362,717, filed on Jun. 29, 2021, now Pat. No. 11,818,128.

(51) Int. Cl.
*H04L 9/40* (2022.01)
*G06F 9/48* (2006.01)
*G06F 9/50* (2006.01)

(52) U.S. Cl.
CPC ........ *H04L 63/0884* (2013.01); *G06F 9/4875* (2013.01); *G06F 9/5088* (2013.01); *H04L 63/0892* (2013.01)

(58) Field of Classification Search
CPC ............ H04L 63/0884; H04L 63/0892; H04L 63/0807; H04L 41/085; H04L 63/0815; G06F 9/4875; G06F 9/5088
See application file for complete search history.

(56) References Cited

U.S. PATENT DOCUMENTS

2019/0098474 A1* 3/2019 Zhu ................... H04W 16/18
2021/0390170 A1* 12/2021 Olden ................. H04L 63/08

* cited by examiner

*Primary Examiner* — Huan V Doan
(74) *Attorney, Agent, or Firm* — Mannava & Kang, P.C.

(57) ABSTRACT

According to examples, an apparatus may include a processor and a memory on which is stored machine-readable instructions that when executed by the processor, may cause the processor to identify configuration information to be used by an on-premise access management service to provide authentication services to applications by users. The processor may also transform the identified configuration information into a transformed set of configuration information to be used by a cloud-based access management service to provide authentication services to the applications by users. In addition, the processor may store the transformed set of configuration information for use by the cloud-based access management service to provide authentication services to the applications by users to migrate authentication of the users from the on-premise access management service to the cloud-based access management service.

20 Claims, 5 Drawing Sheets

MIGRATION OF USER AUTHENTICATION FROM ON-PREMISE TO THE CLOUD

BACKGROUND

Users in organizations may access multiple applications and services through the entry of various user credentials, e.g., user name and password. Some organizations may employ a single sign-on authentication scheme that allows users to access, e.g., log into, the multiple applications and services through the entry of a single set of user credentials.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Many organizations may maintain on-premises access management systems to provide users with authentication services to applications. That is, the organizations may maintain infrastructures on their premises, such as servers, gateways, data storage devices, access points, cooling systems, and/or the like. The organizations may also store and execute software on-premises, in which the software may be executed to authenticate users such that authenticated users may be granted access to certain applications. As used herein, the applications may include services, applications executing on various types of devices, and/or the like.

In some examples, the on-premises software may provide federation services to users such that the users may have single sign-on access to the certain applications. For instance, the software may enable users to access the certain applications through entry of a single set of user credentials, e.g., user name, password, one time code, biometric information, and/or the like. Single sign-on identity management may allow users to access a large number of applications through the single sign-on process, which may save the users time and may make access to the applications more efficient. In some examples, the software may enable the single sign-on access through implementation of claims-based access-control authorization schemes. The claims-based access-control authorization schemes may involve the authentication of users based on sets of claims about the users' identities included in trusted tokens. The trusted tokens may be used and signed by an entity, e.g., the on-premise access management service, that is able to authenticate the users using the sets of user credentials.

The organizations may maintain the on-premise infrastructures necessary to provide users with the authentication services to the applications. This may include purchasing and maintaining servers and networking equipment, setting up cooling systems for the server and the networking equipment, setting up security on the software and networking equipment (e.g., malware protection), updating and executing the security, employing personnel to maintain the infrastructure, etc. Maintaining on-premise infrastructures may thus be cost and labor-intensive. As a result, many organizations may migrate some of the services, such as authentication services, to the cloud. However, the migration of the services may be a relatively difficult undertaking especially in instances in which there are a large number of applications for which single sign-on for users is to be implemented.

Disclosed herein are apparatuses, methods, and computer-readable media in which a processor may migrate authentication of users from an on-premise access management service to a cloud-based access management service in a relatively efficient manner. Particularly, for instance, the processor may identify configuration information that the on-premise access management service may use to provide authentication services to applications by users, such as single sign-on authentication. In addition, the processor may transform the identified configuration information into a transformed set of configuration information to be used by the cloud-based access management service in providing authentication services, such as single sign-on authentication, to the applications by the users. The processor may transform the configuration information of the applications by mapping the configuration information of the applications to configuration information that may be compatible for use by the cloud-based access management service.

In addition, the processor may store the transformed set of configuration information for use by the cloud-based access management service to provide authentication services to the applications by users to migrate authentication of the users from the on-premise access management service to the cloud-based access management service. The migration may not be active until the processor 104 receives an instruction, e.g., from an administrator of the cloud-based management service, to migrate authentication of the users from the on-premise access management service to the cloud-based access management service.

As discussed herein, the processor may perform configuration tests on the rules and/or settings of the applications that are to be migrated to determine whether the applications are ready to be migrated. The configuration tests may be performed to determine whether the rules and/or settings of the applications that the on-premise access management service may use are compatible with the rules and/or settings of the applications that the cloud-based access management service may use. In addition, or alternatively, the processor may determine priorities of the applications and may determine an order in which authentication of access to the applications may be migrated based on the determined priorities of the applications. The processor may output the results of the configuration tests such that, for instance, an administrator may identify any potential issues with the migration and may fix the potential issues prior to initiating the migration.

Through implementation of the features of the present disclosure, user authentication operations may be migrated from an on-premise infrastructure to the cloud in a relatively seamless and efficient manner. For instance, the applications may be made ready for the migration prior to initiating the migration, which may help resolve potential issues that may arise during the migration. In addition, the order in which the applications are to be migrated may be determined such that, for instance, any potential impacts of errors occurring during the migration may be reduced or minimized.

Implementation of the features of the present disclosure may reduce the uncertainty on time, budget, and technical expertise that may be required to migrate applications, e.g., move application identities, to the cloud. Implementation of the features of the present disclosure may also provide the technical improvement of migrating applications with configuration information that may function correctly in the cloud. The authentication of access by users to applications in the cloud may also benefit from the improved scalability, security, updates, and/or the like afforded by the cloud.

Figure 1:
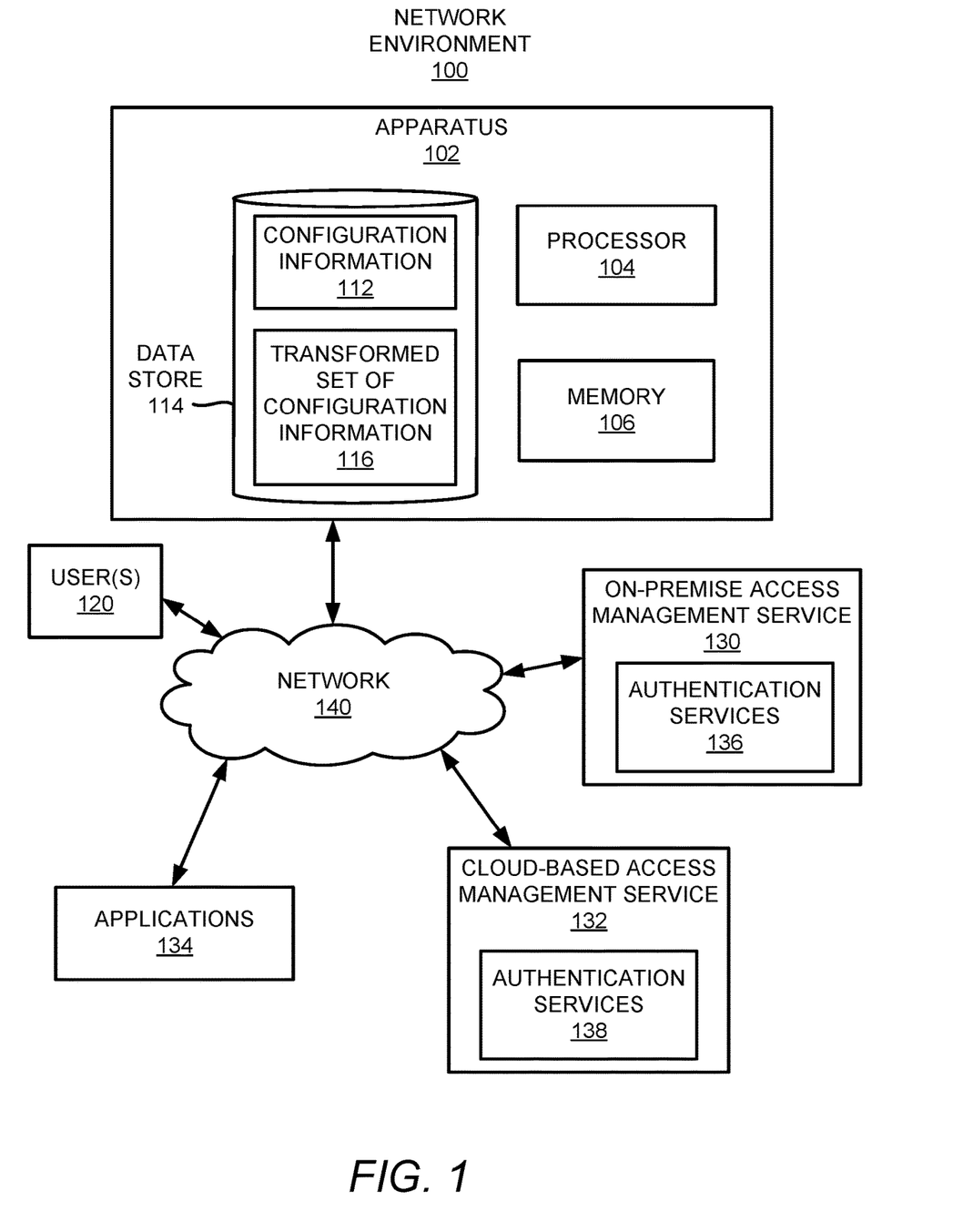
FIG. 1 shows a block diagram of a network environment, in which an apparatus may transform configuration information to be used by an on-premise access management service into a transformed set of configuration information to be used by a cloud-based access management service to provide authentication services to applications such that authentication of users may be migrated to the cloud-based access management service, in accordance with an embodiment of the present disclosure.
Figure 2:
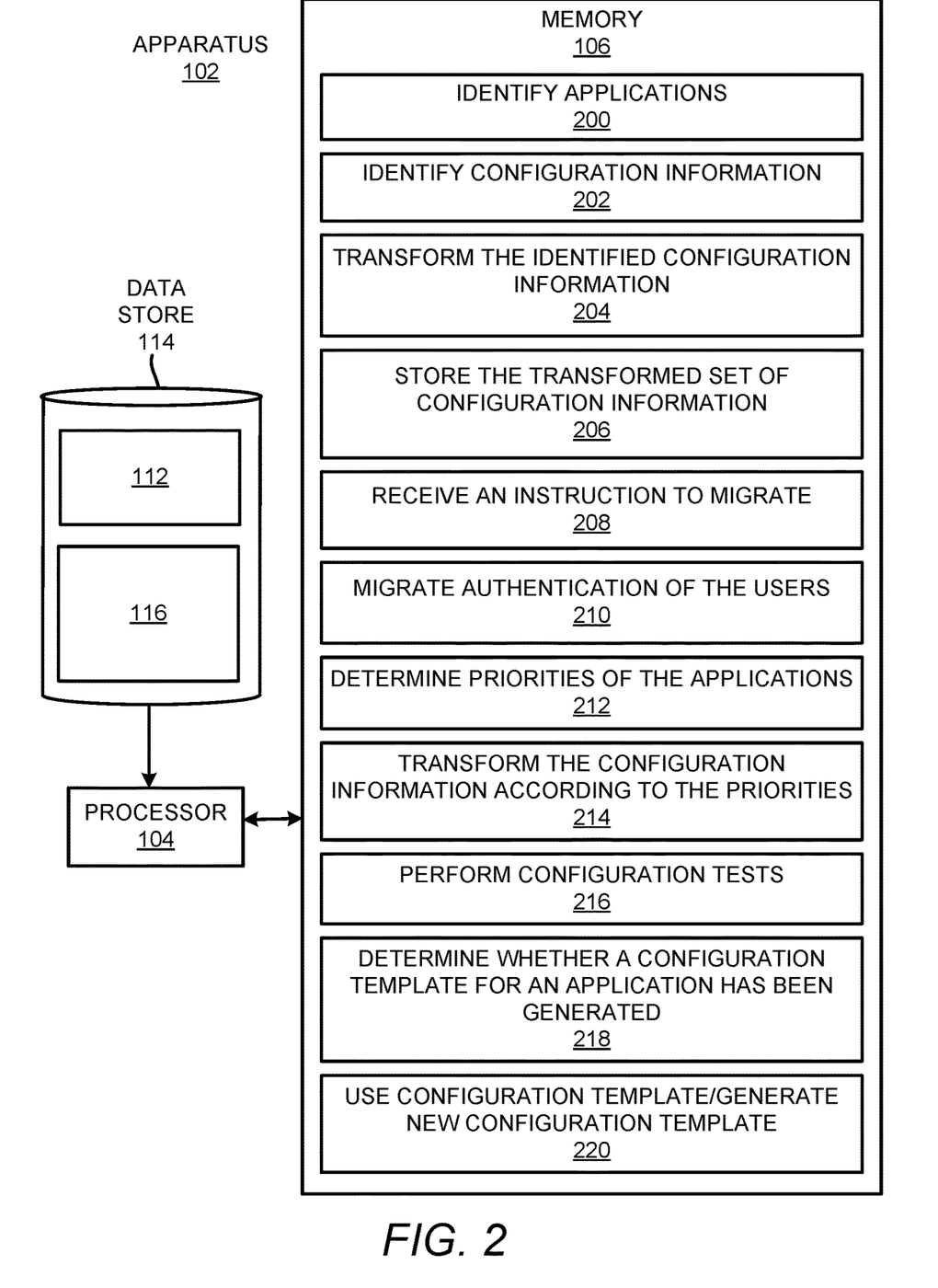
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may transform configuration information to be used by an on-premise access management service into a transformed set of configuration information to be used by a cloud-based access management service to provide authentication services to applications such that authentication of users may be migrated to the cloud-based access management service, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 may include additional features and that some of the features described herein may be removed and/or modified without departing from the scopes of the network environment 100 and/or the apparatus 102.

As shown in FIG. 1, the network environment 100 may include the apparatus 102, a user(s) 120, an on-premise access management service 130, a cloud-based access management service 132, and applications 134. The apparatus 102 may be any type of computing device such as a server, a laptop computer, a desktop computer, a tablet computer, and/or the like. In some examples, the apparatus 102 may be part of the cloud-based access management service 132, e.g., a server in the cloud. In other examples, the functionalities of and/or operations that the apparatus 102 may perform may be distributed across multiple servers, multiple virtual machines, and/or the like, on the cloud.

The applications 134 may be web-based applications that the user 120 (or equivalently, multiple users 120) may access via a network 140. For instance, the applications 134 may be productivity applications, business applications, data storage applications, word processing applications, spreadsheet applications, banking applications, social media applications, and/or the like. The applications 134 may also be applications for which the user 120 may provide user credentials to access. The network 140 may be a local area network, a wide area network, the Internet, and/or the like. According to examples, the on-premise access management service 130 may provide authentication services 136 to the applications 134 by the user 120. Particularly, the on-premise access management service 130 may be an organization specific system, e.g., include an on-premise infrastructure, that may provide users with single sign-on access to the applications 134.

In contrast, the cloud-based access management service 132 may be a multi-tenant system that may provide users in multiple organizations with respective single sign-on access, e.g., authentication services 138, to respective applications 134. That is, a cloud infrastructure, which may include the apparatus 102, may provide the cloud-based access management service 132 via the network 140, which may be the Internet. In some examples, a cloud-based service provider may provide the cloud-based access management service 132. The cloud-based service provider may include a number of servers, virtual machines, data stores, and other types of machines through which the cloud-based access management service 132 may provide the authentication services 138 to the applications 134. As discussed herein, the authentication of the user 120 to access the applications 134 may be migrated from the on-premise access management service 130 to the cloud-based management service 132 such that the cloud-based management service 132 may provide the authentication services 138 to the user 120.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-220 that the processor 104 may execute. Although the instructions 200-220 are described herein as being stored on the memory 106 and may thus include a set of machine-readable instructions, the apparatus 102 may include hardware logic blocks that may perform functions similar to the instructions 200-220. For instance, the processor 104 may include hardware components that may execute the instructions 200-220. In other examples, the apparatus 102 may include a combination of instructions and hardware logic blocks to implement or execute functions corresponding to the instructions 200-220. In any of these examples, the processor 104 may implement the hardware logic blocks and/or execute the instructions 200-220. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to identify the applications 134 to which the on-premise access management service 130 is to provide authentication services 136 to the users 120. For instance, an entity, such as an administrator or other individual of the organization that may own the on-premise access management service 130, may instruct the processor 104 that access to the applications 134 is to be migrated from the on-premise access management service 130 to the cloud-based access management service 132. The entity may instruct the processor 104 through a portal, for instance, a portal provided by the apparatus 102, which may be part of the cloud-based access management service 132. In addition, the entity may provide the apparatus 102 with the identification of the applications 134 to which the on-premise access management service 130 is to or currently provides users with authentication services 136.

The processor 104 may execute the instructions 202 to identify configuration information 112 to be used by the on-premise access management service 130 to provide authentication services 136 to applications 134 by users 120. The processor 104 may identify the configuration information 112 from the identified applications 134. For instance, the processor 104 may identify the configuration information 112 from information received from the cloud-based access management service 132. In addition, the processor 104 may store the identified configuration information 112 in a data store 114, which may be a Random Access memory (RAM), an Electrically Erasable Programmable Read-Only Memory (EEPROM), a storage device, or the like.

The configuration information 112 may include endpoints that may provide access to single sign-on functionalities of the on-premise access management service 130. For instance, the on-premise access management service 130 may be executed in a federation server of an active directory federation service. The endpoints may provide access to the functionalities of the federation server, such as token issuance and the publication of federation metadata. By way of example, the endpoints may be single sign-on uniform resource locators (URLs), certificates, etc.

The configuration information 112 may also include claims that may include statements about users 120, e.g., identity information, to be used by the on-premise access management service 130 in authenticating the users 120. For instance, the on-premise access management service 130 may issue a token that contains a set of claims, in which the decisions regarding which claims the on-premise access management service 130 may accept may be governed by claim rules. In other words, the configuration information 112 may include policies pertaining to the claims that the on-premise access management service 130 may accept. The configuration information 112 may also include an identification of the users who are allowed to access the applications 134.

According to examples, the identified configuration information 112 may be configured for use by the on-premise access management service 130. By way of particular example, the on-premise access management service 130 may have various policies and/or rules that the identified configuration information 112 may follow. In some instances, the configuration information 112 may not be compatible with the cloud-based access management service 132. That is, for instance, the formatting of the configuration information 112 may not be compatible with the cloud-based access management service 132, the cloud-based access management service 132 may not support some of the functionalities with the configuration information 112 that the on-premise access management service 130 may support, and/or the like.

The processor 104 may execute the instructions 204 to transform the identified configuration information 112 into a transformed set of configuration information 116 to be used by the cloud-based access management service 132 to provide authentication services 138 to the applications 134 by users 120. Generally speaking, the processor 104 may transform the identified configuration information 112 such that the cloud-based access management service 132 may use the transformed set of configuration information 116 in providing the single sign-on services to the users.

For instance, the processor 104 may map the endpoints that may provide access to the functionalities of the on-premise access management service 130 to provide users 120 with single sign-on access to the applications 134 to endpoints that may provide access to the functionalities of the cloud-based access management service 132 to provide users 120 with single sign-on access to the applications 134. By way of example, the processor 104 may map the single sign-on URLs used by the on-premise access management service 130 to provide the authentication services 136 to single sign-on URLs that the cloud-based access management service 132 may use to provide the authentication services 138. In some examples, the processor 104 may access a database, a look up table, or other source of data that may include the mappings between the configuration information 112 and the transformed set of configuration information 116.

The processor 104 may also map certificates used by the on-premise access management service 130 to certificates that the cloud-based access management service 132 may use to authenticate the users 120. The processor 104 may further map claims mapping policies from the on-premise access management service 130 to the cloud-based access management service 132.

The processor 104 may execute the instructions 206 to store the transformed set of configuration information 116 for use by the cloud-based access management service 132 to provide authentication services 138 to the applications 134 by users 120. In some examples, the processor 104 may store the transformed set of configuration information 116 in the data store 114. In other examples, such as when the apparatus 102 is not part of the cloud-based access management service 132, the processor 104 may cause the transformed set of configuration information 116 to be stored at a data storage to which the cloud-based access management service 132 may have access.

In some examples, the processor 104 may execute the instructions 208 to receive an instruction to migrate authentication of the users 120 from the on-premise access management service 130 to the cloud-based access management service 132. For instance, the processor 104 may receive an instruction from an entity of the organization that owns the on-premise access management service 130 to stop authenticating users 120 on-premises and instead, to start authenticating the users 120 through the cloud-based access management service 132. In addition, the processor 104 may execute the instructions 210 to migrate authentication of the users 120 from the on-premise access management service 130 to the cloud-based access management service 132. Following the migration of the authentication, when a user 120 attempts to execute a single sign-on action, the cloud-based access management service 132 may authenticate the user 120 instead of the on-premise access management service 130.

In some examples, the processor 104 may execute the instructions 212 to determine priorities of the applications 134. For instance, the processor 104 may determine metrics associated with the applications 134 and may determine the priorities from the metrics. The metrics may include, for instance, the names of the users, the identifiers of the users, the number of users of the applications 134, the number of times users accessed the applications 134 over a period of time, the frequency at which users access the applications 134, and/or the like. In some examples, the on-premise access management service 130 may track the metrics and the processor 104 may receive the tracked metrics from on-premise access management service 130.

In some examples, the priorities of the applications 134 may be used to determine the order in which the applications 134 are to be migrated to the cloud-based access management service 132. For instance, the applications 134 that are accessed with the lowest frequency may be determined to have the highest priority for migration such that errors present during the migration may have a minimal impact on the users 120. In other examples, the applications 134 that have the largest number of users 120 and/or are accessed with the greatest frequency may be determined to have the highest priority. In any of these examples, the processor 104 may execute the instructions 214 to transform the identified configuration information 112 in an order according to the determined priorities of the applications 134 to which the configuration information 112 correspond.

According to examples, the processor 104 may execute the instructions 216 to perform configuration tests on the configuration information 112 of each of a plurality of the applications 134 to determine whether the applications 134 are ready to be migrated. For instance, the processor 104 may determine whether there are rules and/or settings in the on-premise access management service 130 that may be incompatible with rules and/or settings in the cloud-based access management service 132. In some examples, the configuration tests may depend on rules and/or settings of the on-premise access management service 130 and the cloud-based access management service 132 and may thus vary depending upon the specific on-premise access management service 130 and the specific cloud-based access management service 132 to which the applications 134 are to be migrated.

The processor 104 may determine that an application 134 is ready to be migrated when there are no issues identified that may block the migration of the application 134. Likewise, the processor 104 may determine that an application 134 is not ready to be migrated when an issue is identified that may block the migration of the application 134. For the applications 134 that are determined to be ready to be migrated, the processor 104 may transform the configuration information 112 corresponding to those applications 134. Additionally, for the applications that are determined to not be ready to be migrated, the processor 104 may output an indication that the rules and/or settings of the applications are to be reviewed and/or fixed. The processor 104 may also output transforms of the configuration information 112 that the processor 104 may have identified, even if the processor 104 does not recognize the transform.

The configuration tests may include a test to determine whether the applications 134 include a rule that may not be migratable to the cloud-based access management service 132. In instances in which a rule is determined to not be migratable, a warning may be issued. As another example, the configuration tests may include a test to determine whether the on-premise access management service 130 includes an endpoint for an application 134 that is not supported by the cloud-based access management service 132. The processor 104 may determine that an application with such an endpoint may not be ready to be migrated. As a further example, the configuration test may include a test to determine whether the on-premise access management service 130 includes a setting that specifies whether the application 134 is configured to only allow certain authentication types that the cloud-based access management service 132 may not include.

Additional settings may include whether an application is configured to ignore single sign-on cookies, whether an application is configured to auto update, whether an application has custom delegation authorization rules, whether an application has custom impersonation authorization rules defined, whether an application has custom issuance authorization rules defined, whether an application has custom issuance transform rules defined, whether the on-premise access management service 130 is configured to monitor a federation metadata for an application, and/or the like.

The processor 104 may execute the instructions 218 to determine whether configuration templates for the applications 134 have been generated. The configuration templates may include information that the processor 104 may use to create the applications 134 in the cloud-based access management service 132. For instance, each of the applications 134 may have their own way to configure single sign-on and the templates may make it easier for the applications 134 to be created in the cloud-based access management service 132. In addition, the processor 104 may execute the instructions 220 to, based on a determination that a configuration template for an application 134 has been generated, use the configuration template for the application 134 to migrate the application from the on-premise access management service 130 to the cloud-based access management service 132. However, based on a determination that a configuration template for the application 134 has not been generated, the processor 104 may generate a new configuration template based on information received from a user 120.

Figure 3:
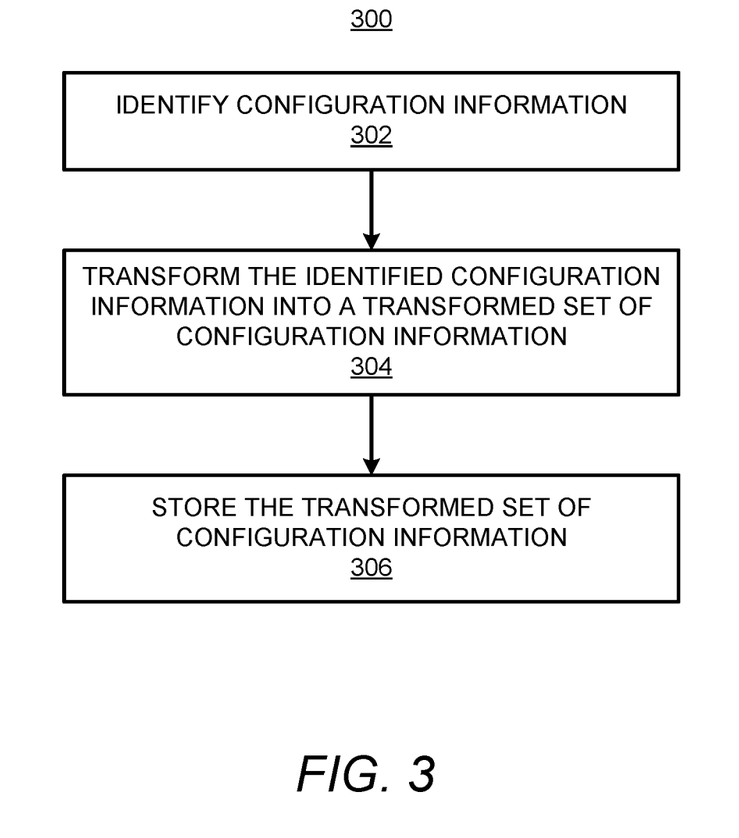
FIGS. 3 and 4, respectively, depict flow diagrams of methods for transforming configuration information of applications into a transformed set of configuration information that a cloud-based access management service may use to provide authentication services to the applications by users such that authentication of users may be migrated to the cloud-based access management service, in accordance with embodiments of the present disclosure.
Figure 4:
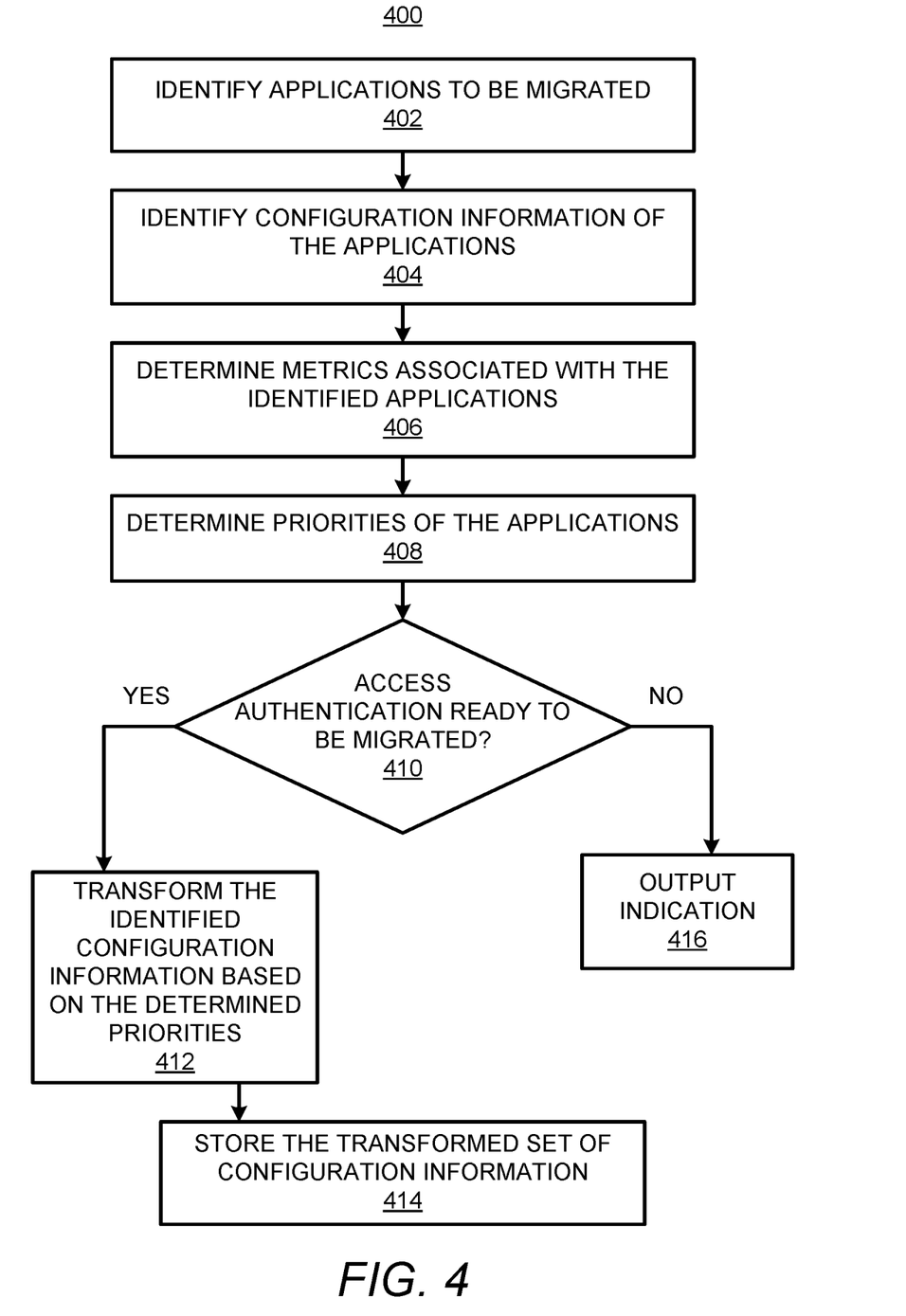

Various manners in which the processor 104 of the apparatus 102 may operate are discussed in greater detail with respect to the methods 300 and 400 respectively depicted in FIGS. 3 and 4. Particularly, FIGS. 3 and 4, respectively, depict flow diagrams of methods 300, 400 for transforming configuration information 112 of applications 134 into a transformed set of configuration information 116 that a cloud-based access management service 132 may use to provide authentication services 138 to the applications 134 by users such that authentication of users may be migrated to the cloud-based access management service 132, in accordance with embodiments of the present disclosure. It should be understood that the method 300 may include additional operations and that some of the operations described therein may be removed and/or modified without departing from the scopes of the methods 300 and 400. The descriptions of the methods 300 and 400 are made with reference to the features depicted in FIGS. 1 and 2 for purposes of illustration.

At block 302, the processor 104 may identify configuration information 112 that an on-premise access management service 130 is to use to provide authentication services 136 to applications 134 by users 120. As discussed herein, the configuration information 112 may include endpoints and claims. As also discussed herein, the on-premise access management service 130 may be an organization specific system that may provide users 120 with single sign-on access to the applications 134.

At block 304, the processor 104 may transform the identified configuration information 112 into a transformed set of configuration information 116 that a cloud-based access management service 132 may use to provide authentication services 138 to the applications 134 by the users 120. As discussed herein, the cloud-based access management service 132 may include a multi-tenant system that may provide users 120 in multiple organizations with respective single sign-on access to respective applications 134 via the network 140, such as the Internet. For instance, a cloud services provider may provide the cloud-based management service 132 and the owner of the on-premise access management service 130 may be a tenant of the cloud services provider.

At block 306, the processor 104 may store the transformed set of configuration information 116 for use by the cloud-based access management service 132 in providing authentication services 138 to the applications 134 by the users 120.

With reference now to FIG. 4, at block 402, the processor 104 may identify the applications 134 to which the on-premise access management service 130 is to provide authentication services 138 to the users 120. At block 404, the processor 104 may identify configuration information 112 of the identified applications 134. At block 406, the processor 104 may determine metrics associated with the identified applications 134. In addition, at block 408, the processor 104 may determine priorities of the applications based on the determined metrics as discussed herein.

In some examples, the processor 104 may, at block 410, determine, for each of a plurality of applications 134, whether the configuration information 112 for the application 134 is ready to be migrated. As discussed herein, the processor 104 may perform configuration tests on the configuration information 112 of an application 134 to determine whether authentication of access to the application 134 is ready to be migrated. For the applications 134 that are determined to be ready to be migrated (e.g., applications for which authentication of access to the applications 134 or application identities are ready to be migrated), at block 412, the processor 104 may transform the configuration information 112 corresponding to the applications 134 into transformed sets of configuration information 116. In some examples, the processor 104 may transform the configuration information 112 according to an order corresponding to the determined priorities of the applications 134 to which the configuration information 112 respectively correspond. In addition, at block 414, the processor 104 may store the transformed set of configuration information 116 for use by the cloud-based access management service 132 in providing authentication services 138 to the applications 134 by the users 120.

However, for the applications 134 that are determined to not be ready to be migrated (e.g., applications for which authentication of access to the applications or application identities are determined to not be ready to be migrated), the processor 104 may output an indication that the rules and/or settings of the applications 134 are to be reviewed and/or fixed. For instance, the processor 104 may output an indication that there is a rule and/or a setting in the on-premise access management service 130 that may be incompatible with the cloud-based access management service 132. The indication may include the incompatible rule and/or setting such that a recipient of the indication may fix the incompatibility issue.

In some examples, the processor 104 may receive an instruction to migrate authentication of the users 120 from the on-premise access management service 130 to the cloud-based access management service 132. In addition, the processor 104 may cause the authentication of the users 120 to be migrated from the on-premise access management service 130 to the cloud-based access management service 132 based on receipt of the instruction.

In some examples, the processor 104 may, for each of the applications 134, determine whether a configuration template for the application 134 has been generated. Based on a determination that a configuration template for the application 134 has been generated, the processor 104 may use the configuration template for the application 134 to migrate management of access to the application from the on-premise access management service 130 to the cloud-based access management service 132. However, based on a determination that a configuration template for the application 134 has not been generated, the processor 104 may generate a new configuration template based on information received from a user.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
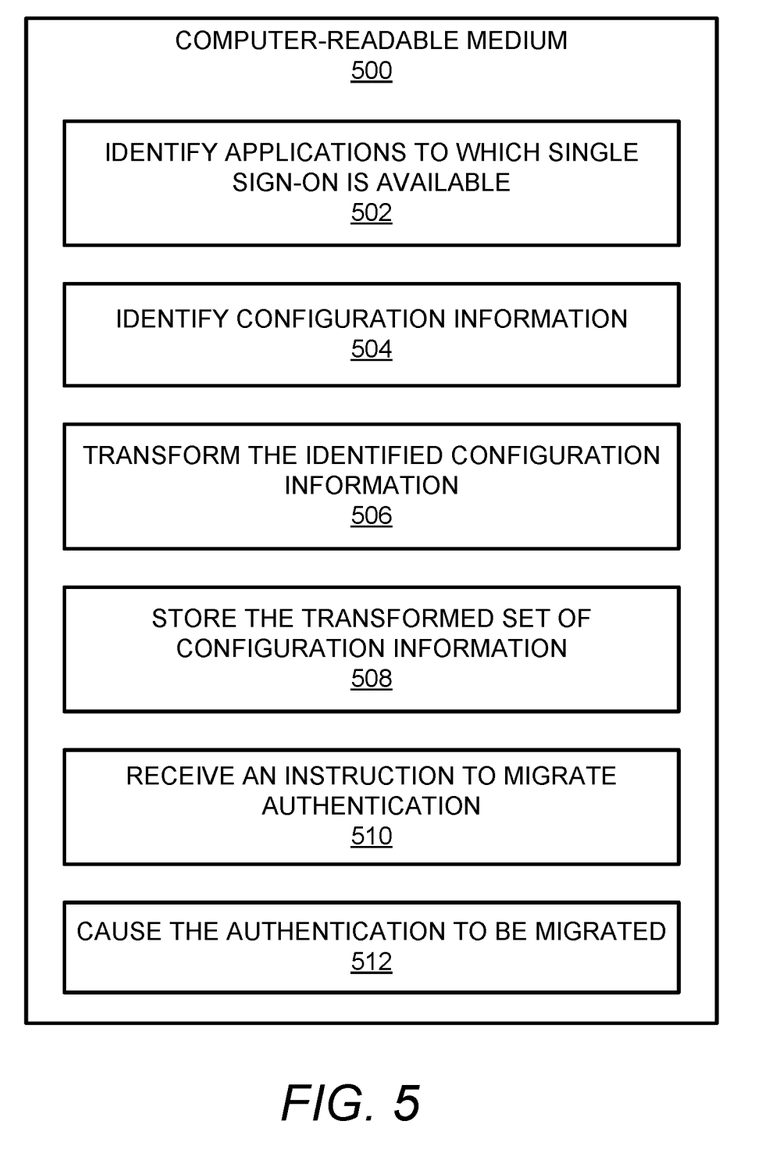
FIG. 5 shows a block diagram of a computer-readable medium that may have stored thereon computer-readable instructions for migrating management of access to applications by users from an on-premise access management service to a cloud-based access management service, in accordance with an embodiment of the present disclosure.

Turning now to FIG. 5, there is shown a block diagram of a computer-readable medium 500 that may have stored thereon computer-readable instructions for migrating management of access to applications 134 by users 120 from an on-premise access management service 130 to a cloud-based access management service 132, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-512 that a processor, such as a processor 104 of the apparatus 102 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to identify applications 134 to which an on-premise access management service 130 may provide single sign-on authentication services to a plurality of users 120. The processor may fetch, decode, and execute the instructions 504 to identify configuration information 112 that the on-premise access management service 130 may use to provide the plurality of users 120 with the single sign-on authentication services 136 to the applications 134. The processor may fetch, decode, and execute the instructions 506 to transform the identified configuration information 112 into a transformed set of configuration information 116 that a cloud-based access management service 132 may use to provide the plurality of users 120 with single sign-on authentication services 138 to the applications 134. The processor may also fetch, decode, and execute the instructions 508 to store the transformed set of configuration information 116 for use by the cloud-based access management service 132 in providing the plurality of users 120 with the single sign-on authentication services 138 to the applications 134.

In some examples, the processor may fetch, decode, and execute the instructions 510 to receive an instruction to migrate authentication of the plurality of users 120 from the on-premise access management service 130 to the cloud-based access management service 132. In addition, the processor may fetch, decode, and execute the instructions 512 to cause the authentication of the plurality of users 120 to be migrated from the on-premise access management service 130 to the cloud-based access management service 132 based on receipt of the instruction.

As discussed herein, and in some examples, the processor may determine metrics associated with the identified applications 134, may determine priorities of the applications 134 based on the determined metrics, and may transform the identified configuration information 112 in an order according to the determined priorities of the applications 134 to which the configuration information 112 correspond. In addition, or alternatively, the processor may perform configuration tests on the configuration information 112 of the identified applications 134 to determine which of the application are ready to be migrated. For the applications 134 for which authentication of access to the applications 134 are determined to be ready to be migrated, the processor may transform the configuration information 112 corresponding to the applications. However, for the applications 134 for which authentication of access to the applications 134 are determined to not be ready to be migrated, the processor 104 may output an indication that the rules and/or settings are to be reviewed and/or fixed.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
identify configuration information to be used by an on-premise access management service to provide authentication services to applications by users;
identify the applications to which the on-premise access management service is to provide authentication services to the users;
determine, for each of a plurality of the applications, whether authentication of access to the application is ready to be migrated;
for the applications for which authentication of access to the applications are determined to be ready to be migrated, transform the configuration information corresponding to the applications; and
for the applications for which authentication of access to the applications are determined to not be ready to be migrated, output an indication that rules and/or settings of the applications are to be reviewed and/or fixed.

2. The apparatus of claim 1, wherein, to determine, for each of a plurality of the applications, whether authentication of access to the application is ready to be migrated, the instructions cause the processor to:
perform configuration tests on the rules and/or settings of the application to determine whether authentication of access to the application is ready to be migrated.

3. The apparatus of claim 1, wherein the instructions cause the processor to:
transform the identified configuration information into a transformed set of configuration information to be used by a cloud-based access management service to provide authentication services to the applications by users; and
store the transformed set of configuration information for use by the cloud-based access management service to provide authentication services to the applications by users to migrate authentication of the users from the on-premise access management service to the cloud-based access management service.

4. The apparatus of claim 3, wherein the instructions cause the processor to:
migrate authentication of the users from the on-premise access management service to the cloud-based access management service.

5. The apparatus of claim 3, wherein the on-premise access management service comprises an organization specific system that is to provide users with single sign-on access to the applications and wherein the cloud-based access management service comprises a multi-tenant system that is to provide users in multiple organizations with respective single sign-on access to respective applications.

6. The apparatus of claim 3, wherein the instructions cause the processor to:
for each of the applications,
determine whether a configuration template for the application has been generated; and
based on a determination that a configuration template for the application has been generated, use the configuration template for the application to migrate management of access to the application from the on-premise access management service to the cloud-based access management service.

7. The apparatus of claim 1, wherein the configuration information comprises endpoints that provide access to single sign-on functionalities of the on-premise access management service and claims that include statements about users to be used by the on-premise access management service in authenticating the users.

8. The apparatus of claim 1, wherein the instructions cause the processor to:
identify the applications to which the on-premise access management service is to provide authentication services to the users;
determine metrics associated with the identified applications;
determine priorities of the applications based on the determined metrics; and
transform the identified configuration information in an order according to the determined priorities of the applications to which the configuration information correspond.

9. A method comprising:
identifying, by a processor, configuration information that an on-premise access management service is to use to provide authentication services to applications by users, the configuration information comprising endpoints and claims;
identifying, by the processor, the applications to which the on-premise access management service is to provide authentication services to the users;
determining, for each of a plurality of the applications and by the processor, whether authentication of access to the application is ready to be migrated;
for the applications for which authentication of access to the applications are determined to be ready to be migrated, transforming, by the processor, the configuration information corresponding to the applications; and
for the applications for which authentication of access to the applications are determined to not be ready to be migrated, outputting, by the processor, an indication that rules and/or settings of the applications are to be reviewed and/or fixed.

10. The method of claim 9, further comprising:
transforming the identified configuration information into a transformed set of configuration information that a cloud-based access management service is to use to provide authentication services to the applications by the users; and
storing the transformed set of configuration information for use by the cloud-based access management service in providing authentication services to the applications by the users.

11. The method of claim 10, wherein the on-premise access management service comprises an organization specific system that is to provide users with single sign-on access to the applications and wherein the cloud-based access management service comprises a multi-tenant system that is to provide users in multiple organizations with respective single sign-on access to respective applications.

12. The method of claim 10, further comprising:
receiving an instruction to migrate authentication of the users from the on-premise access management service to the cloud-based access management service.

13. The method of claim 12, further comprising:
causing the authentication of the users to be migrated from the on-premise access management service to the cloud-based access management service based on receipt of the instruction.

14. The method of claim 10, further comprising:
for each of the applications,
determining whether a configuration template for the application has been generated;
based on a determination that a configuration template for the application has been generated, using the configuration template for the application to migrate management of access to the application from the on-premise access management service to the cloud-based access management service; and
based on a determination that a configuration template for the application has not been generated, generating a new configuration template based on information received from a user.

15. The method of claim 9, further comprising:
identifying the applications to which the on-premise access management service is to provide authentication services to the users;
determining metrics associated with the identified applications;
determining priorities of the applications based on the determined metrics; and
transforming the identified configuration information in an order according to the determined priorities of the applications to which the configuration information correspond.

16. The method of claim 9, further comprising:
identifying the applications to which the on-premise access management service is to provide authentication services to the users;
determining, for each of a plurality of applications, whether authentication of access to the application is ready to be migrated;
for the applications for which authentication of access to the applications are determined to be ready to be migrated, transforming the configuration information corresponding to the applications; and
for the applications for which authentication of access to the applications are determined to not be ready to be migrated, outputting an indication that rules and/or settings of the applications are to be reviewed and/or fixed.

17. The method of claim 16, wherein determining, for each of a plurality of applications, whether authentication of access to the application is ready to be migrated, further comprises performing configuration tests on the rules and/or settings of the application to determine whether authentication of access to the application is ready to be migrated.

18. A non-transitory computer-readable medium on which is stored computer-readable instructions that when executed by a processor, cause the processor to:
- identify configuration information to be used by an on-premise access management service is to provide single sign-on authentication services to applications by a plurality of users;
- identify the applications to which the on-premise access management service is to provide authentication services to the plurality of users;
- determine, for each of a plurality of the applications, whether authentication of access to the application is ready to be migrated;
- for the applications for which authentication of access to the applications are determined to be ready to be migrated, transform the configuration information corresponding to the applications; and
- for the applications for which authentication of access to the applications are determined to not be ready to be migrated, output an indication that rules and/or settings of the applications are to be reviewed and/or fixed.

19. The computer-readable medium of claim 18, wherein the instructions further cause the processor to:
- identify configuration information that the on-premise access management service is to use to provide the plurality of users with the single sign-on authentication services to the applications;
- transform the identified configuration information into a transformed set of configuration information that a cloud-based access management service is to use to provide the plurality of users with single sign-on authentication services to the applications; and
- store the transformed set of configuration information for use by the cloud-based access management service in providing the plurality of users with the single sign-on authentication services to the applications.

20. The computer-readable medium of claim 19, wherein the instructions further cause the processor to:
- receive an instruction to migrate authentication of the plurality of users from the on-premise access management service to the cloud-based access management service; and
- cause the authentication of the plurality of users to be migrated from the on-premise access management service to the cloud-based access management service based on receipt of the instruction.

\* \* \* \* \*